United States Patent
Nakase

[19]

[11] Patent Number: 5,902,161
[45] Date of Patent: May 11, 1999

[54] AIR TEMPERATURE SENSOR ARRANGEMENT FOR A SMALL WATERCRAFT

[75] Inventor: Ryoichi Nakase, Iwata, Japan

[73] Assignee: Yamaha Hatsudoki Kabushiki Kaisha, Iwata, Japan

[21] Appl. No.: 09/082,858

[22] Filed: May 21, 1998

[30] Foreign Application Priority Data

May 21, 1997 [JP] Japan ................................ 9-130910

[51] Int. Cl.$^6$ .................................................. B63H 21/10
[52] U.S. Cl. ................................................. 440/88; 440/1
[58] Field of Search .............................. 440/1, 2, 77, 88, 440/89; 114/270; 123/198 DC, 198 D, 195 P

[56] References Cited

U.S. PATENT DOCUMENTS 5,553,579   9/1996   Yoshida et al. ..................... 123/295
5,558,549   9/1996   Nakase et al. ........................ 440/88
5,846,102   12/1998  Nitta et al. .......................... 440/88

*Primary Examiner*—Stephen Avila
*Attorney, Agent, or Firm*—Knobbe, Martens, Olson & Bear LLP

[57]  ABSTRACT

An arrangement for at least one air temperature sensor for measuring the temperature of air entering the combustion chamber of a fuel injected engine powering a water propulsion device of a watercraft is disclosed. The watercraft has a hull defining an engine compartment in which the engine is positioned. The engine has a body defining at least one combustion chamber and an output shaft arranged to drive the water propulsion device. At least one air duct provides air through the hull into the engine compartment, the duct leading from the hull to an outlet in the engine compartment. The engine has an intake system for providing air to the combustion chamber and a fuel system for providing fuel to the combustion chamber, the fuel system including at least one fuel injector. The arrangement of the air temperature sensor(s) reduces or limits each sensor's exposure to water.

19 Claims, 6 Drawing Sheets

AIR TEMPERATURE SENSOR ARRANGEMENT FOR A SMALL WATERCRAFT

FIELD OF THE INVENTION

The present invention relates to an air temperature sensor arrangement. More particularly, the invention is an air temperature sensor arrangement to be used in conjunction with a fuel injected engine of the type powering a small watercraft.

BACKGROUND OF THE INVENTION

Internal combustion engines are commonly used to power small watercraft such as personal watercraft. These watercraft include a hull which defines an engine compartment. The engine is positioned in the engine compartment. The output shaft of the engine is coupled to a water propulsion device of the watercraft, such as an impeller.

Air must be supplied to the engine from outside the hull for use in the combustion process. Typically, air flows through one or more ducts in the hull into the engine compartment, and then through an intake system of the engine to the combustion chamber(s) thereof.

The intake system commonly includes an air intake into which air from within the engine compartment is drawn. This air then flows through an intake pipe to the combustion chamber(s) of the engine.

Fuel is also supplied to the engine for use in the combustion process. In order to accurately meter the fuel and improve engine operating efficiency and performance, the fuel is injected into the combustion chambers with one or more fuel injectors. In this arrangement, fuel is supplied to the fuel injector at high pressure. Each injector has an electrically operated valve which selectively opens and closes, controlling the flow of fuel therethrough to the engine.

The amount of fuel to be injected in order to achieve optimum performance is partially dependent on the density of air also entering the combustion chamber. For this reason, at least one air temperature sensor may be used to provide air temperature data for use in calculating the density of the air entering the combustion chamber so that the amount of fuel injected by the fuel injector(s) may be adjusted accordingly.

One problem associated with this arrangement is that water may contact the air temperature sensor and damage it. In particular, water often flows with the air through the intake ducts into the engine compartment. This water may directly flow onto the sensor, or pool in the bottom of the hull and splash about due to the pitching and rocking movement of the watercraft as it moves through the water. When the water sprays or splashes onto the air temperature sensor, it may interfere with the accurate operation of the sensor, and even corrode the sensor and interrupt the electrical signal flowing therefrom, preventing the signal from communicating with the fuel injector.

An improved air temperature sensor arrangement for an engine powering a watercraft is desired.

SUMMARY OF THE INVENTION

In accordance with the present invention there is provided an improved air temperature sensor arrangement for an engine. Preferably, the engine is of the type used to power a watercraft. The watercraft has a water propulsion device and a hull defining an engine compartment in which the engine is positioned. At least one air duct allows air from outside the hull to be drawn into the engine compartment.

The engine has a body defining at least one combustion chamber and has an output shaft arranged to drive the water propulsion device. Air is supplied to the combustion chamber of the engine through an air inlet device.

The air inlet device includes an intake pipe extending outwardly from the engine and an air box connected to the intake pipe. The air box has a cover having a top and a bottom and defining an interior air chamber, an air inlet provided near the top of the air box and a drain provided through the bottom of the air box. The intake pipe has a passage therethrough leading from the interior air chamber of the air box to the engine.

Fuel is provided to the engine by a fuel system. The fuel system includes at least one fuel injector which delivers fuel to the combustion chamber(s). For optimum performance, the amount of fuel delivered to the combustion chamber(s) is partially dependent on the temperature of the air that will enter the chamber(s). Accordingly, air temperature sensor(s) are provided to measure the air temperature and generate an electrical signal to communicate with the fuel injector(s) so that the amount of fuel injected by the injector(s) may be adjusted to achieve optimum combustion performance.

In the arrangement of the present invention, each air temperature sensor is positioned higher above a bottom of the hull than the outlet of the air duct in the engine compartment. In one preferred embodiment, an air temperature sensor is mounted in the engine compartment on the side of the hull out of the direct line between the outlet of the air duct and the inlet of the engines air inlet device. In another preferred embodiment at least one sensor is mounted near the inlet to the air box so as to be protected from splashing water by the body of the engine, the exhaust system, and the air box itself.

In other preferred embodiments of the present invention the air temperature sensors is mounted within the air intake system. In two of these embodiments, sensors may be mounted within the air box anywhere except the top or bottom of the box. Another preferred embodiment allows an air temperature sensor to be mounted at the top of the air box so long as the sensor extends slightly into the box from the surface on which it is mounted. The air temperature element of the sensor is accordingly located on the inward end of the sensor. In another embodiment, an air temperature sensor is positioned in the air box so as to be protected from water splashes by a deflector wall inside the air box. In still another embodiment the sensor is placed in the air intake system downstream of a spark arrestor. In another embodiment, an air temperature sensor is also placed downstream of the spark arrestor and at the inlet to the throttle body unit.

Further objects, features, and advantages of the present invention over the prior art will become apparent from the detailed description of the drawings which follows, when considered with the attached figures.

DETAILED DESCRIPTION OF TEE PREFERRED EMBODIMENTS OF THE INVENTION

The present invention is an air temperature sensor arrangement to be used in cooperation with a fuel injected engine of the type utilized to power a small watercraft, such as a personal watercraft. The air temperature sensor arrangement is described in conjunction with an engine powering a personal watercraft since this is an application for which the arrangement has particular utility. Those of skill in the art will appreciate that the arrangement may have utility in a wide variety of other settings.

Figure 1:
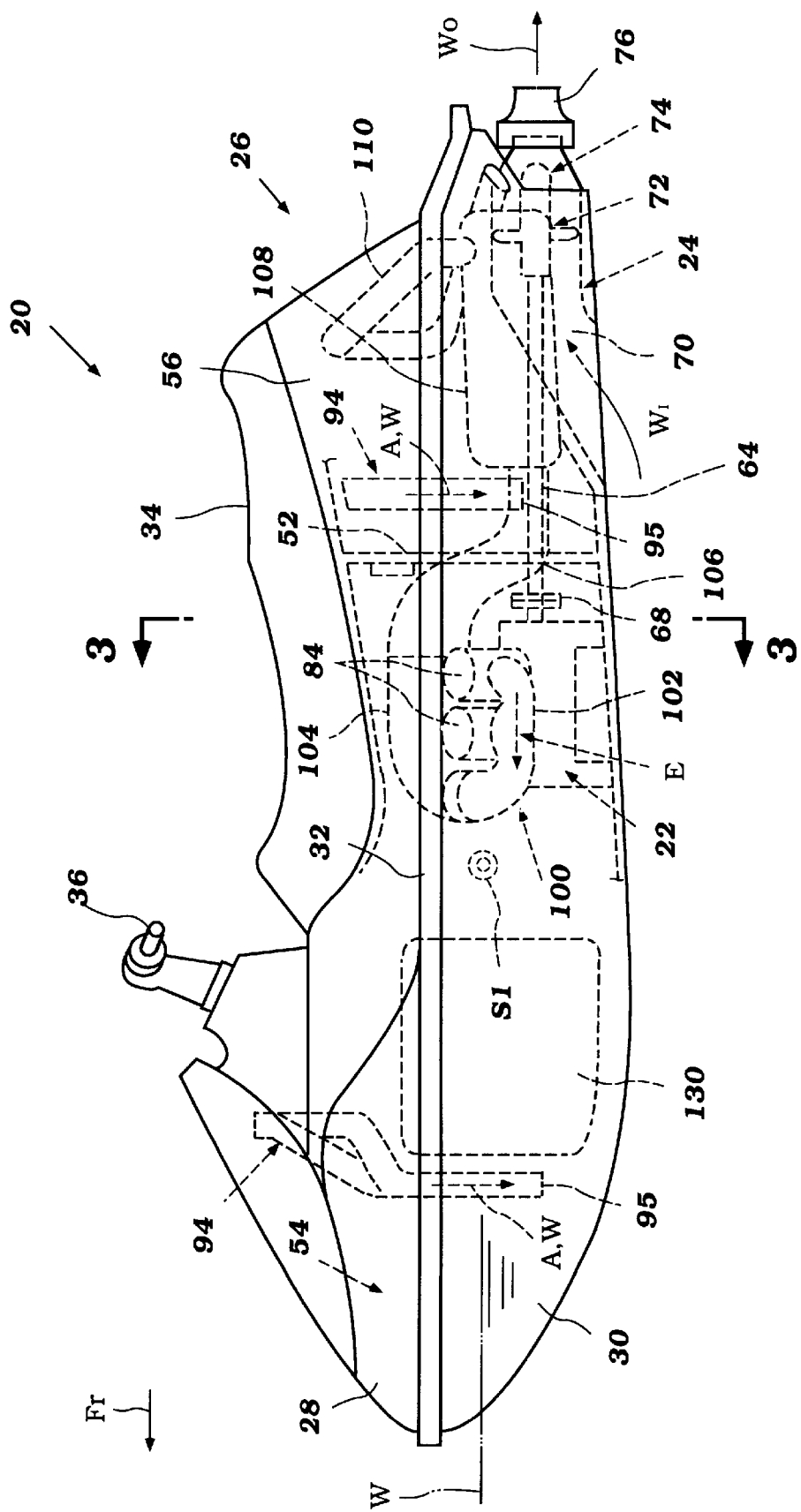
FIG. 1 is a side view of a watercraft of the type having an air temperature sensor arrangement in accordance with a first embodiment of the present invention, the engine and other watercraft components positioned within a hull of the watercraft illustrated in phantom.
Figure 2:
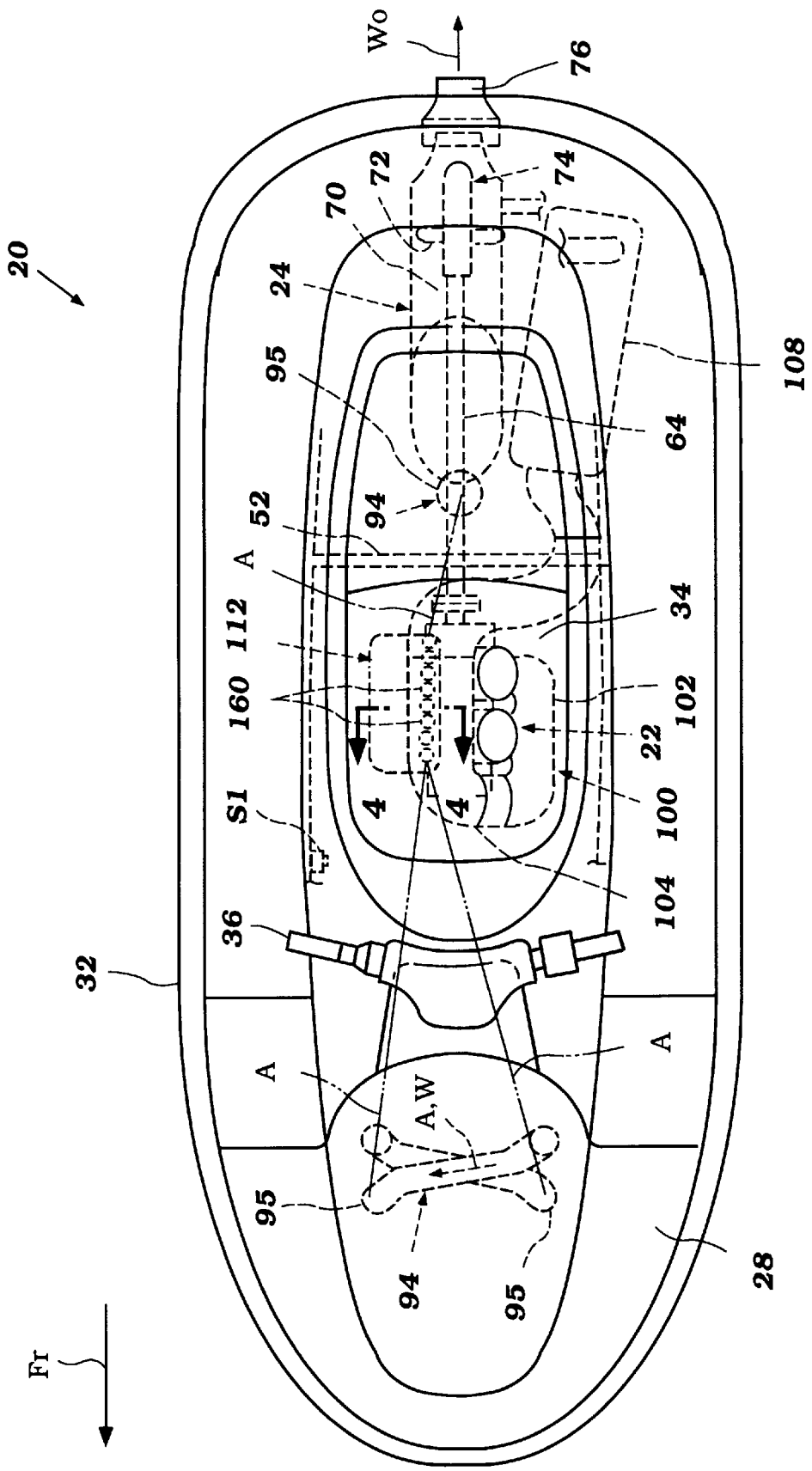
FIG. 2 is a top view of the watercraft illustrated in FIG. 1, with the engine and other watercraft components positioned within the watercraft illustrated in phantom.

FIGS. 1 and 2 illustrate a watercraft 20 having a watercraft body comprising a hull 26 having a top portion or deck 28 and a lower portion 30. A gunnel 32 defines the intersection of the lower portion 30 of the hull 26 and the deck 28. The watercraft 20 is suited for movement through a body of water W in a direction Fr (towards a front end of the watercraft).

A seat 34 is positioned on the top portion 28 of the hull 26. The seat 34 is preferably connected to a first removable deck member. A steering handle 36 is provided adjacent the seat 34 for use by a user in directing the watercraft 20.

Figure 3:
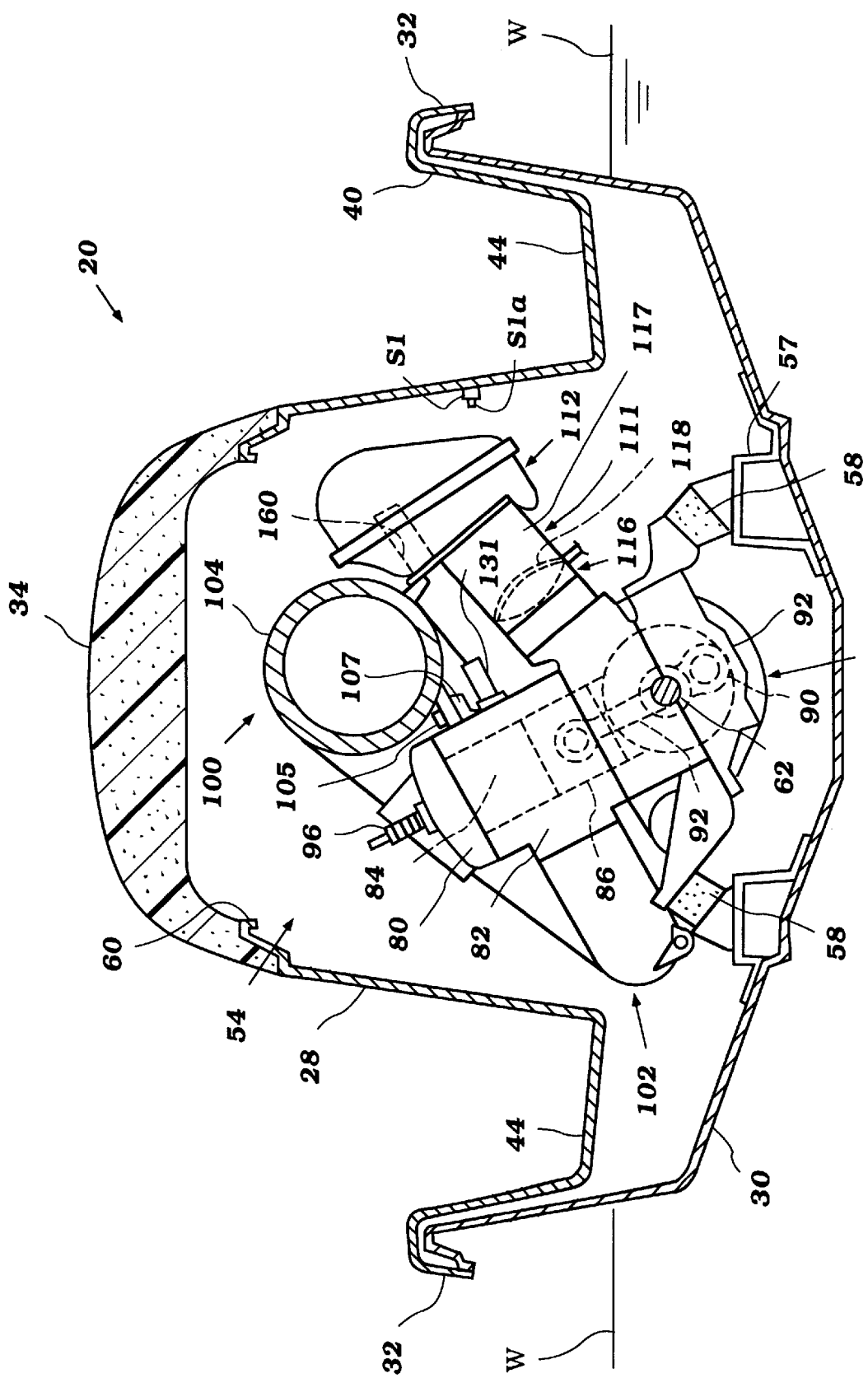
FIG. 3 is a cross-sectional end view of the watercraft illustrated in FIG. 1 taken along line 3—3 therein.

As best illustrated in FIG. 3, a bulwark 40 extends upwardly along each side of the watercraft 20. A foot step area 44 is defined between the seat 34 and the bulwark 40 on each side of the watercraft 20.

The top and bottom portions 28, 30 of the hull 26, along with a bulkhead 52, define an engine compartment 54 and a pumping or propulsion unit compartment 56. The engine 22 is positioned in the engine compartment 54. As best illustrated in FIG. 3, the engine 22 is connected to the hull 26 with several engine mounts 58 connected to a bottom of the lower portion 30 of the hull 26. The engine 22 is preferably partially accessible through a maintenance opening 60 accessible by removing a deck member on which the seat 34 is mounted.

The engine 22 has a crankshaft 62 (see FIG. 3) which is in driving relation with an impeller shaft 64 via a coupling 68 (see FIG. 1). The impeller shaft 64 rotationally drives a means for propelling water of a propulsion unit 24.

The propulsion unit 24 is preferably a water jet-propulsion unit including a propulsion passage 70 having an intake port which extends through the lower portion 30 of the hull 28. The means for propelling water, preferably an impeller 72 driven by the impeller shaft 64, is positioned in the passage 70 and draws water $W_I$ into the inlet. The impeller 72 drives the water through the passage 70 to a jet outlet 74 which discharges into a nozzle 76. The nozzle 76 is mounted for movement for directing water $W_O$ which is expelled from the rear or stem of the watercraft 20, whereby the direction of the propulsion force for the watercraft 20, and thus its direction, may be varied. Preferably, the position of the nozzle 76 is controlled with the steering handle 36.

The engine 22 preferably has two cylinders and operates on a two-cycle, crankcase compression principle. Of course, the engine 22 may have as few as one, or more than two, cylinders, as may be appreciated by one skilled in the art.

The engine 22 includes a cylinder head 80 mounted to a cylinder block 82 and cooperating therewith to define the two cylinders 84. A piston 86 is movably mounted in each cylinder 84 and is connected to the crankshaft 62 via a connecting rod 88, as is well known in the art. The piston 86 cooperates with the block 82 and head 80 to define a combustion chamber portion of each cylinder 84.

The crankshaft 62 is partially located within a crankcase chamber 90. This chamber 90 is defined by a crankcase cover 92 connected to an end of the cylinder block 82 of the engine 22 generally opposite the head 80. The crankcase chamber is divided into compartments corresponding to each cylinder 84.

As best illustrated in FIG. 3, the engine 22 includes means for providing air to each cylinder 84. Preferably, air is drawn into the engine compartment 54 through one or more air ducts 94 (see FIG. 1). As illustrated in FIG. 1, a pair of ducts are positioned in front of the engine 22 near the front end of the watercraft 20, and another duct 94 is positioned behind the engine 22 towards the stem of the watercraft 20. Each duct 94 defines a passage leading through the hull 26 to an outlet 95 positioned in the engine compartment 54. So arranged, air A flows from outside of the hull 26 into the engine compartment 54. In addition, however, water W may flow through these ducts 94 into the engine compartment 54 with the air A.

Figure 4:
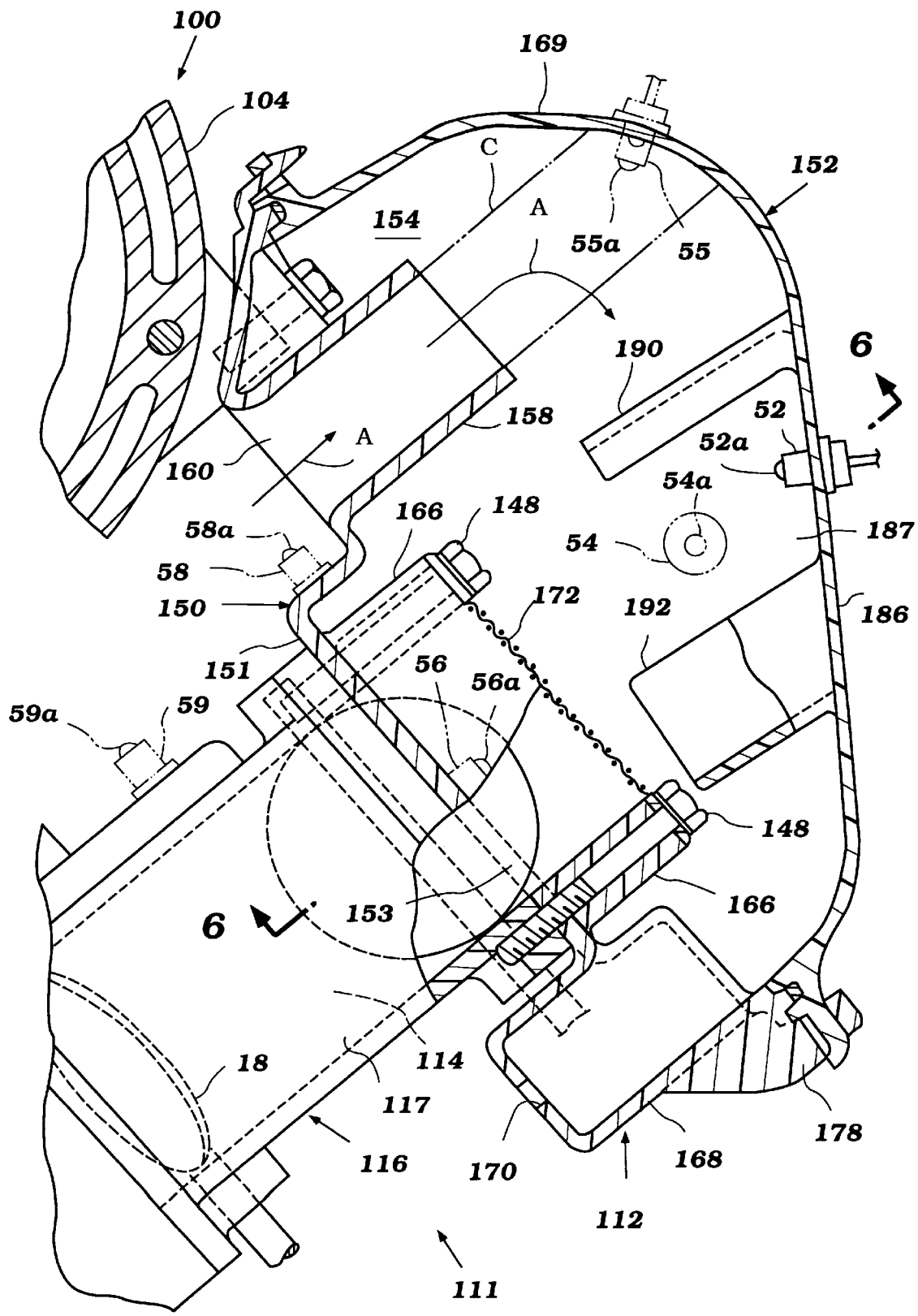
FIG. 4 is an enlarged cross-sectional end view of an air intake device illustrated in FIGS. 2 and 3, taken in the direction of line 4—4 in FIG. 2.

Referring to FIG. 4, air within the engine compartment 54 is supplied to the engine 22 through an air intake system 111. The intake 111 includes an air box 112 into which air from within the engine compartment 54 is drawn, the air is then delivered therefrom to a throttle valve unit 116 and into a passage 114 through a throttle body 117. A throttle valve 118 is movably positioned in the passage 114 through the throttle body 117. The valve is preferably controlled by a throttle control (not shown) located at the steering handle 36, and is arranged to control the flow rate of air through the throttle body 117.

The air which selectively passes beyond the throttle valve unit 116 then passes into a compartment of the crankcase chamber 90 as is known in the art. In this arrangement, air delivered to a particular crankcase chamber 90 compartment is partially compressed by the downward movement of the piston 86 corresponding to that chamber 90. This air is then delivered from the chamber 90 to the cylinder 84 through one or more scavenge passages (not shown). Fuel is then mixed with this air by a fuel injector 131. The piston 86 then further compresses the mixture and upon combustion, the piston 86 is driven downwardly, turning the crankshaft 62. When the piston 86 moves upwardly, air is drawn into the crankcase chamber 90 to supply the next air charge.

Fuel is provided to each cylinder 84 by a fuel system (not shown). A fuel pump (not shown) delivers the fuel at high pressure from a fuel tank 130 to a fuel injector 131 corresponding to each cylinder 84. In the embodiment illustrated, each injector 131 is arranged to directly inject fuel into a cylinder 84. Those of skill in the art will appreciate that one or more injectors 84 may be used to indirectly inject the fuel, such as into the air passing through the throttle passage 114.

Preferably, combustion of the air and fuel mixture provided to each cylinder 84 is initiated with a spark plug 96 (see FIG. 3). The firing of each spark plug 96 is controlled by a suitable ignition system as is well known to those of skill in the art.

Referring to FIGS. 1–3, the exhaust E from each cylinder 84 flows through an exhaust system 100 to a discharge from the watercraft 20. Preferably, this exhaust system 100 includes an exhaust manifold 102 which is connected to the engine 22.

The manifold 102 extends towards a front end of the engine 22 where it is connected to an expansion pipe 104, preferably through a flexible coupling (not shown). A catalyst (not shown) may be provided in the exhaust system, such as in the expansion pipe 104. The expansion pipe 104 extends along the engine 22 towards the rear of the watercraft 20 to an upper exhaust pipe 106. As illustrated in FIG. 3, the expansion pipe 104 is preferably mounted to the cylinder block 82 by one or more fasteners 105 which are mounted to one or more mounting bosses 107 extending from the outside of the cylinder block.

The upper exhaust pipe 106 leads to a water lock 108. The water lock 108 prevents the back flow of water through the exhaust system 100 and may be of a variety of types known to those of skill in the art.

After passing through the water lock 108, the exhaust flows through a lower exhaust pipe 110 to a discharge from the watercraft 20. Preferably, the exhaust is discharged into the body of water W in which the watercraft 20 is being operated.

The construction of the air box 112 will now be described in more detail with reference to FIGS. 4–5. The box 112 has a lower portion or base 150. The base 150 has a relatively flat plate section 151 which is directly mounted to the end of the throttle valve unit 116 which extends away from the engine 22. Passages are provided through the plate section 151 of the base 150 corresponding to the passage 114 defined through each throttle body 117 (there being a throttle body 117 corresponding to each cylinder 84 of the engine). The air box 112 is secured to the throttle valve until 116 by fasteners 148.

A guide wall 158 extends upwardly from the generally flat plate section 151 of the base 150. The guide wall 158 defines a number of cylindrical inlet passages 160. The guide wall 158 terminates within an interior chamber 154 defined by a cover 152 connected to the base 150.

As oriented, the airbox 112 has a top surface or wall 169 (defined by the cover 152) which defines the part of the box 112 which is positioned highest in the engine compartment 54. Side walls 186, 187 (see FIG. 6) at a front and rear end of the box 112 is defined at the intersection of a lower side wall portion 168 of the base 150 and the plate 151.

A divider wall 166 extends upwardly from the plate section 151 of the base 150. This wall 166 defines an oblong area 188 around openings 153 in the base 150 leading to the passage 114 through each throttle body 117. A spark arrestor 172 in the form of a metallic net is preferably mounted at the top of this wall 166 over this area 188.

A number of front deflectors 190 preferably extend into the chamber 154 from the cover 152. Each deflector 190 is preferably "V"-shaped, with the point of the "V" facing towards the inlet passages 160. Each deflector 190 is preferably positioned between an opening 153 and the air inlet passages 160 as defined by the guide wall 158. As illustrated, each deflector 190 extends downwardly towards a front portion of the divider wall 166 and cooperates therewith to define a small passage therebetween.

A second deflector 192 is provided corresponding to each passage 153. These deflectors 192 are semi-circular in shape and also extend downwardly from the cover 152 into the chamber 154. These deflectors 192 are positioned near the bottom portion of the divider wall 166.

As illustrated, the front and rear deflectors 190, 192 and divider wall 166 cooperate to define an air path from the inlet passages 160 to the passages 153 through the base 150 which are generally indirect, reducing the probability of water entering the engine 22.

Water which is trapped in the air box 112 is preferably drained therefrom by a number of drains 170. The drains 170 are primarily positioned in the lowest portion of the box 112 between the lower side wall portion 168 of the base 150 and the divider wall 166. Additional drains may be provided as needed.

The cover 152 is connected to the base 150 with a pair of hinges 175 as is well known to those skilled in the art.

Though not illustrated, the engine 22 may include a flywheel connected to one end of the crankshaft 62 and having a number of magnets thereon for use in a pulsar-coil arrangement for generating firing signals for the ignition system. In addition, the ignition system may include a battery for use in providing power to an electric starter and other electrical engine features. One such electrical feature would be a controller (not shown) which receives air temperature data from at least one air temperature sensor S1–S9 and uses that data to determine and signal for the appropriate amount of fuel to be injected by the fuel injectors 131. In addition, a number of teeth may be mounted on the periphery of the flywheel for use in starting the engine 22 with a starter motor (not illustrated).

The engine 22 includes a lubricating system for providing lubricating oil to the various moving parts thereof. Preferably, the lubricating system includes an oil tank or reservoir (not shown) from which lubricating oil is delivered to and circulated throughout the engine, as is well known to those skilled in the art. The engine 22 may also be provided with a suitable cooling system as known to those of skill in the art.

In accordance with the embodiments of the current invention, air temperature sensors S1–S9 are positioned or arranged so that their exposure to water is reduced or limited. Sensors S1–S9 may be mounted in their respective positions by any appropriate method known to those skilled in the art.

A first embodiment air temperature sensor arrangement is illustrated in FIGS. 1–3. At least one air temperature sensor S1 is mounted in the engine compartment 54 on a side wall of the lower portion 30 of the hull 26. The sensor S1 is mounted so as to be higher than the outlets 95 of the air ducts 94 (see FIG. 1). As stated above, water W sometimes accompanies air A coming through the air ducts 94. Since the sensor S1 is mounted higher than the air duct outlets 95, it is out of the natural path of such water W, thus contact with that water W is minimized. In addition, being mounted high along the wall of the hull 26, water therein is unlikely to splash up onto the sensor S1. Also, as illustrated in FIG. 2, the sensor S1 mounted as described in this embodiment is preferably mounted out of the direct line that the air A travels between the outlet 95 and the air box inlet 160. Thus, contact is minimized with corrosives such as water that may still be retained (such as in vapor form) in that air flow A.

Figure 5:
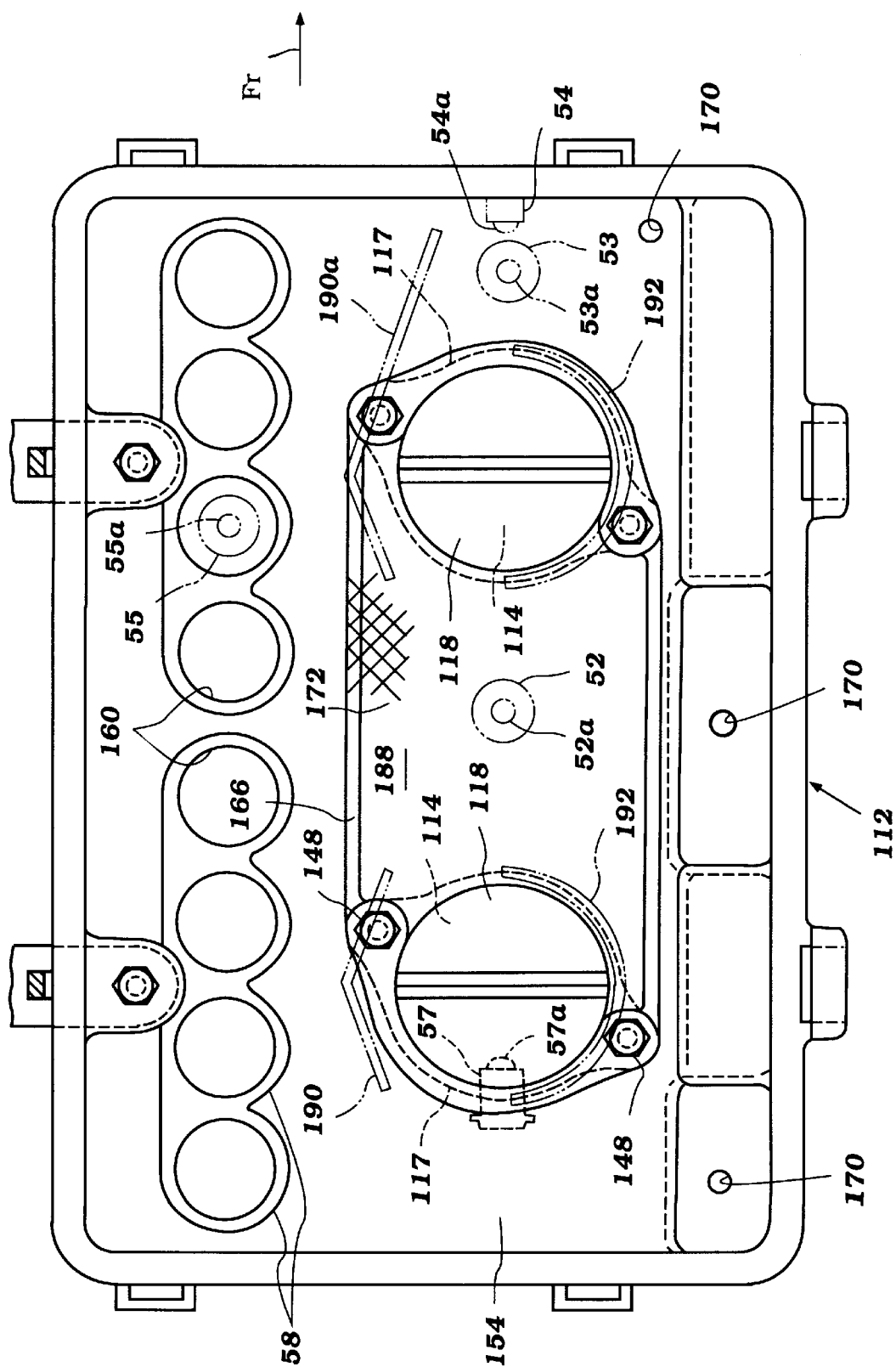
FIG. 5 is a top view of an air box of the air intake device illustrated in FIG. 4, with a cover of the air box removed.
Figure 6:
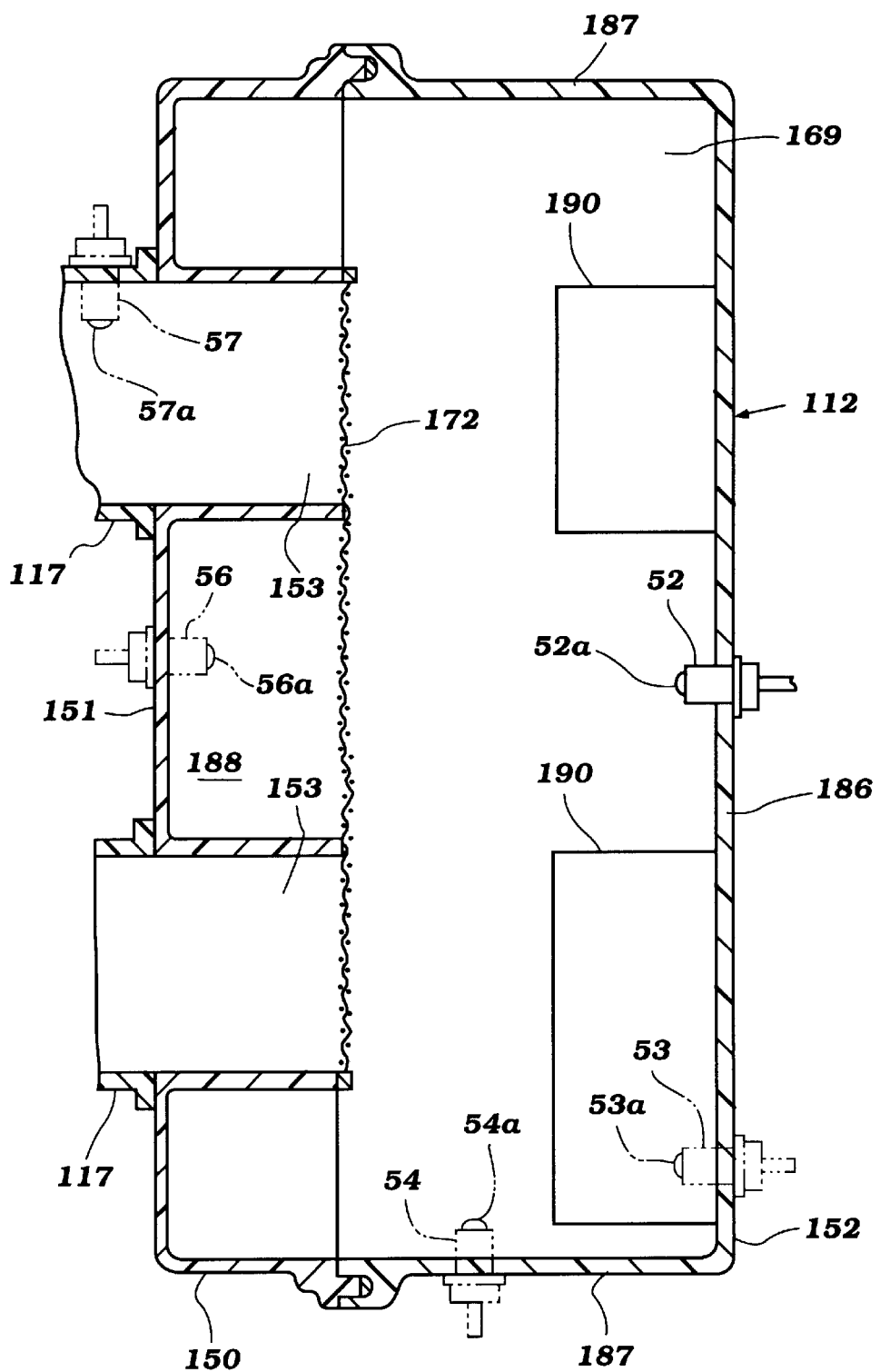
FIG. 6 is a cross-sectional end view of the air box illustrated in FIG. 4 (with the cover attached) taken in the direction of line 6—6 therein.

Referring to FIGS. 4–6, in accordance with a second embodiment arrangement at least one air temperature sensor S2, S4 is mounted within the air box 112 on one of the substantially vertical side walls 186, 187. By virtue of its position on the middle side wall 186, a sensor S2 is unlikely to be covered with water which may accumulate around the lower wall 168 near a drain 170 or, if the watercraft 20 is turned upside down, at the upper wall 169. In another arrangement of this embodiment, an air temperature sensor S4 is mounted within the air box 112 on either the end side wall 187 toward the front Fr end or rear end of the watercraft 20. Such an arrangement will enjoy the same water-limiting advantages of the first arrangement of this embodiment.

To further reduce the possibility that water may encounter these sensors S2, S4, they are preferably mounted so that they extend inwardly from the surface on which they are mounted. The air temperature elements S2*a*, S4*a* are located on the inward ends of the sensors S2, S4. Thus arranged, the air temperature elements S2*a*, S4*a* are protected from water which may flow on the surface of the walls.

In a third embodiment, at least one air temperature sensor S3 is arranged within the air box 112 on the middle side wall 186 so as to be vertically underneath an extended front deflector 190*a*. The extended deflector 190*a* deflects water and air laden with vapor from flowing across the sensor S3 through the box 112 from the passages 160 to the opening 153. The deflector 190*a* is similar to the front deflector 190 disclosed above except that one arm or portion of the "V"-shaped deflector is extended so as to be long enough to cover the sensor S3.

In a fourth embodiment, illustrated in FIGS. 4 and 5, at least one air temperature sensor S5 is mounted in the air box 112 within the extension lines C of one of the inlet passages 160. By virtue of this position, air flows directly to the sensor S5, enabling an accurate measurement of air A actually entering the intake system 111.

In this embodiment, the sensor S5 is mounted so as to be vertically higher than the opening of the passage 160. The sensor S5 may be mounted on or near the top wall 169 of the air box 112. In such a case, however, the sensor S5 must extend into the interior chamber 154 from the wall 169 so that the air temperature element S5*a* located on the inward end of the sensor S5 is better protected from immersion in water W that may accumulate at the top wall 169 should the watercraft 20 be turned upside down.

Referring to FIGS. 4 and 6, in a fifth embodiment, at least one air temperature sensor S6 may be mounted downstream or below of the spark arrestor 172 in the oblong area 188 defined by the divider wall 166 between the openings 153. As discussed above, the air box 112 is designed to separate air A from water W so water W is prevented from entering the engine. Placement of the sensor S6 downstream of the spark arrestor 172 places the sensor S6 in an environment unlikely to contain water W because such water W has already been separated by the air box 112 and will not readily pass through the spark arrestor 172.

In another arrangement of this embodiment illustrated in FIG. 6, an air temperature sensor S7 is mounted on a wall of the throttle body 117. In this arrangement, also downstream of the spark arrestor 172, the sensor S7 enjoys the same advantages of water avoidance shared by the previous arrangement of this embodiment. In this arrangement, the sensor S7 extends into the passage 114 through the throttle body 117, through which air A flows immediately before entering a crankcase chamber 90 and the cylinder 84. Thus, this placement enables very accurate measurement of air A about to enter the cylinder.

In a sixth embodiment, illustrated in FIG. 4, at least one air temperature sensor S9 is mounted to the intake system 111 but external to the air box 112. As illustrated, the sensor S9 is mounted to the exterior of the throttle body 111 near the entrances to the passages 160 into the air box 112. In this embodiment, the sensor S9 is protected from water splashing about the engine compartment 54 due to the pitching and rocking movements of the watercraft 20 as it moves through the body of water. This protection is accomplished by the engine 22, the exhaust system 100, and the air intake system 111, which will each block some of the splashing water. In another arrangement of this embodiment, an air temperature sensor S8 is mounted to an exterior surface of the air box 112 and again immediately adjacent to the passageway 160 leading into the air box 112. Such an arrangement enjoys the same benefits of the position of the sensor S9 in the first arrangement of this embodiment, and is more easily mounted.

In each of these embodiments, an air temperature sensing element S1*a*–S9*a* may be located on the body of the sensors S1–S9 at an end portion which extends from the surface each sensor S1–S9 may mounted on. Such an arrangement protects the element S1*a*–S9*a* from contact with any water that may flow directly along the surface to which the sensor S1–S9 is mounted.

The embodiments and arrangements discussed above may be combined to create still further embodiments and arrangements. For example, use of multiple air temperature sensors S1–S9 may necessitate combining aspects of a plurality of embodiments to obtain a desired arrangement.

In addition, the teachings of sensor placement herein may be adapted to an intake system which differs in layout from that described above.

Of course, the foregoing description is that of preferred embodiments of the invention, and various changes and modifications may be made without departing from the spirit and scope of the invention, as defined by the appended claims.

What is claimed is:

1. A watercraft having a hull defining an engine compartment, an internal combustion engine positioned in said engine compartment, said watercraft including a water propulsion device, said engine having an output shaft arranged to power said water propulsion device, at least one air duct providing air through said hull into said engine compartment, said duct leading from said hull to an air outlet in said engine compartment, said engine having an intake system for providing air to at least one combustion chamber thereof and a fuel system for providing fuel to said at least one combustion chamber, said fuel system including at least one fuel injector, said watercraft also having at least one air temperature sensor in said engine compartment so as to be vertically higher than said air outlet.

2. The watercraft in accordance with claim 1, wherein said sensor is positioned out of a direct path between said air outlet and an inlet for said intake system.

3. A watercraft having a hull defining an engine compartment, an internal combustion engine positioned in said engine compartment, said watercraft including a water propulsion device, said engine having an output shaft arranged to power said water propulsion device, at least one air duct providing air through said hull into said engine compartment, said duct leading from said hull to an outlet in said engine compartment, said engine having an intake system for providing air to at least one combustion chamber thereof and a fuel system for providing fuel to said at least one combustion chamber, said fuel system including at least one fuel injector, said intake system including an intake pipe extending outwardly from said engine and an air box connected to said intake pipe, said air box having an air inlet and a drain provided through a bottom of said air box, and at least one air temperature sensor mounted within said air box.

4. The watercraft in accordance with claim 3, wherein said box includes side walls extending between said top and said bottom of said air box and said at least one air temperature sensor is mounted to at least one of said side walls within said air box.

5. The watercraft in accordance with claim 4, wherein said air box has a front side wall oriented toward a front end of said watercraft, a rear side wall oriented toward a rear end of said watercraft, and a middle side wall oriented between said front and rear side wall, and at least one of said air temperature sensors is mounted to said middle side wall within said air box.

6. The watercraft in accordance with claim 4, wherein said air box has a front side wall oriented toward a front end of said watercraft and at least one air temperature sensor is mounted to said front side wall within said air box.

7. The watercraft in accordance with claim 4, wherein said air box has a rear side wall oriented toward a rear end of said watercraft and at least one air temperature sensor is mounted to said rear side wall within said air box.

8. The watercraft in accordance with claim 4, wherein said at least one air temperature sensor extends inwardly from at least one of said side walls on which said sensor is mounted and an air temperature element is located on an inwardly extending end of said sensor.

9. The watercraft in accordance with claim 3, wherein said at least one sensor is mounted within said air box so as to be in direct line with air that may enter said air box through said air inlet.

10. The watercraft in accordance with claim 9, wherein said sensor is mounted vertically above said air inlet.

11. The watercraft in accordance with claim 3, wherein said at least one sensor is mounted at said top wall and said sensor extends inwardly from said top wall and an air temperature element is located on an inwardly extending end of said sensor.

12. The watercraft in accordance with claim 3, wherein said air box has at least one deflector extending into said air box and said at least one sensor is mounted so that said front deflector is positioned between said sensor and said air inlet.

13. The watercraft in accordance with claim 3, wherein a dividing wall within said air box defines an area at which said air box connects to said intake pipe, and a spark arrestor extends over said area defined by said dividing wall and at least one of said air temperature sensors is mounted within said area.

14. The watercraft in accordance with claim 3, wherein said sensor is mounted to said bottom of said air box, said sensor including a body extending into said air box and an air temperature sensor element located on said body so as to be spaced into said air box from said bottom thereof.

15. A watercraft having a hull defining an engine compartment, an internal combustion engine positioned in said engine compartment, said watercraft including a water propulsion device, said engine having an output shaft arranged to power said water propulsion device, at least one air duct providing air through said hull into said engine compartment, said duct leading from said hull to an outlet in said engine compartment, said engine having an intake system for providing air to at least one combustion chamber thereof and a fuel system for providing fuel to said at least one combustion chamber, said fuel system including at least one fuel injector, said intake system including an intake pipe extending outwardly from said engine and an air box connected to said intake pipe, and at least one air temperature sensor mounted within said intake pipe.

16. The watercraft in accordance with claim 15, wherein said intake pipe at least partially comprises a throttle body.

17. The watercraft in accordance with claim 16, wherein at least one of said sensor is mounted in said throttle body.

18. A watercraft having a hull defining an engine compartment, an internal combustion engine positioned in said engine compartment, said watercraft including a water propulsion device, said engine having an output shaft arranged to power said water propulsion device, at least one air duct providing air through said hull into said engine compartment, said duct leading from said hull to an outlet in said engine compartment, said engine having an intake system for providing air to at least one combustion chamber thereof and a fuel system for providing fuel to said at least one combustion chamber, said fuel system including at least one fuel injector, said intake system including an intake pipe extending outwardly from said engine and an air box connected to said intake pipe, said air box having an air inlet, said watercraft having at least one air temperature sensor mounted on an outer surface of a portion said intake system near said inlet to said air box.

19. The watercraft in accordance with claim 18, wherein at least one of said sensors is mounted immediately adjacent to said inlet to said air box.

\* \* \* \* \*